United States Patent [19]

Conrad

[11] 4,048,856
[45] Sept. 20, 1977

[54] QUICK SHUT-OFF DIRECT READING LIQUID LEVEL INDICATOR

[76] Inventor: Donald W. Conrad, R.D. 1, Box 300, Duncannon, Pa. 17020

[21] Appl. No.: 701,488

[22] Filed: June 30, 1976

[51] Int. Cl.² ............... F16K 37/00; G01F 23/02
[52] U.S. Cl. .................................. 73/324; 73/332; 137/558
[58] Field of Search ............ 73/332, 333, 323, 324; 137/559, 625.47, 558

[56] References Cited

U.S. PATENT DOCUMENTS

| | | | |
|---|---|---|---|
| 85,179 | 12/1868 | Marshall | 73/333 |
| 839,618 | 12/1906 | Murphy | 74/324 |
| 1,061,832 | 5/1913 | Geisinger | 73/333 |
| 1,373,274 | 3/1921 | Tajima | 73/324 |
| 1,468,117 | 9/1923 | Lowden | 73/333 |
| 1,979,705 | 11/1934 | Raymond | 73/323 X |
| 3,185,179 | 5/1965 | Harautuneian | 137/625.47 |
| 3,721,265 | 3/1973 | Hoffland | 137/625.47 |

*Primary Examiner*—Daniel M. Yasich
*Attorney, Agent, or Firm*—R. Sciascia; R. Beers; S. Sheinbein

[57] ABSTRACT

A quick shut-off device for attachment to the side of a liquid filled container to measure the amount of liquid therein. Upper and lower valves with a sight glass extending between them are provided with ball valves to allow the on-off positions of the upper and lower valves to be controlled by a 90° change in position of rods connected to the ball valves. In the closed position of both valves, the interior of the sight glass and the main ball valve passageways are in alignment for easy cleaning without sight glass removal. The upper and lower valves are identical in construction so they can be readily interchanged.

6 Claims, 4 Drawing Figures

QUICK SHUT-OFF DIRECT READING LIQUID LEVEL INDICATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to liquid level indicators and more particularly to providing quick shut-off with easy cleaning and replacability for such indicators.

In the field of liquid level indicators it has long been common to use upper and lower angle valves with a sight glass between them, the valves being attached to the side of the container being monitored (e.g. a boiler supply tank). A problem heretofore has been that these indicators have generally used valves requiring several turns of a hand wheel to close them, and have required removal of the sight glass for cleaning. In addition, it has been required to stock upper and lower valves separately since they are not interchangable. This has proven to be a distinct disadvantage where their use has been on shipboard since storage space is at a premium and parts replacement sources greatly limited.

SUMMARY OF THE INVENTION

Accordingly, there is provided a liquid level indicator wherein the upper and lower valves are identical to one another and contain ball valves to control the liquid flow. The use of ball valves allow for quick shut-off by a single 90° rotation of a rod connected to the ball valves by a shafts. Identical top and bottom externally threaded extensions are provided on each of the valves to allow for attachment of either the sight glass packing nut or a clean-out cap. The ball valves are arranged such that when they are in a closed position removal of the clean-out caps of the upper and lower valves allows free access to the main passageways of the ball valves, the outlet passageways of the upper and lower valves, and the interior of the sight glass for cleaning. Since the upper and lower valves are identical, they can be interchanged merely by screwing the packing nut and clean-out cap on the proper one of the top and bottom externally threaded extensions and rotating the ball valve to align properly with the inlet passageway and the sight glass.

OBJECTS OF THE INVENTION

It is therefore an object of the present invention to provide a liquid level indicator that can be quickly opened and closed.

Another object of the present invention is to allow for easy cleaning of a liquid level indicator.

A further object of the present invention is to provide interchangeable parts in a liquid level indicator.

Yet another object of the invention is to allow for easy sight glass removal from a liquid level indicator.

BRIEF DESCRIPTION OF THE DRAWINGS

These and other objects, features and attendant advantages to the present invention will become better understood by reference to the following detailed description when considered in connection with the accompanying drawings where.

DETAILED DESCRIPTION OF THE PREFERRED EMBODIMENT

Figure 1:
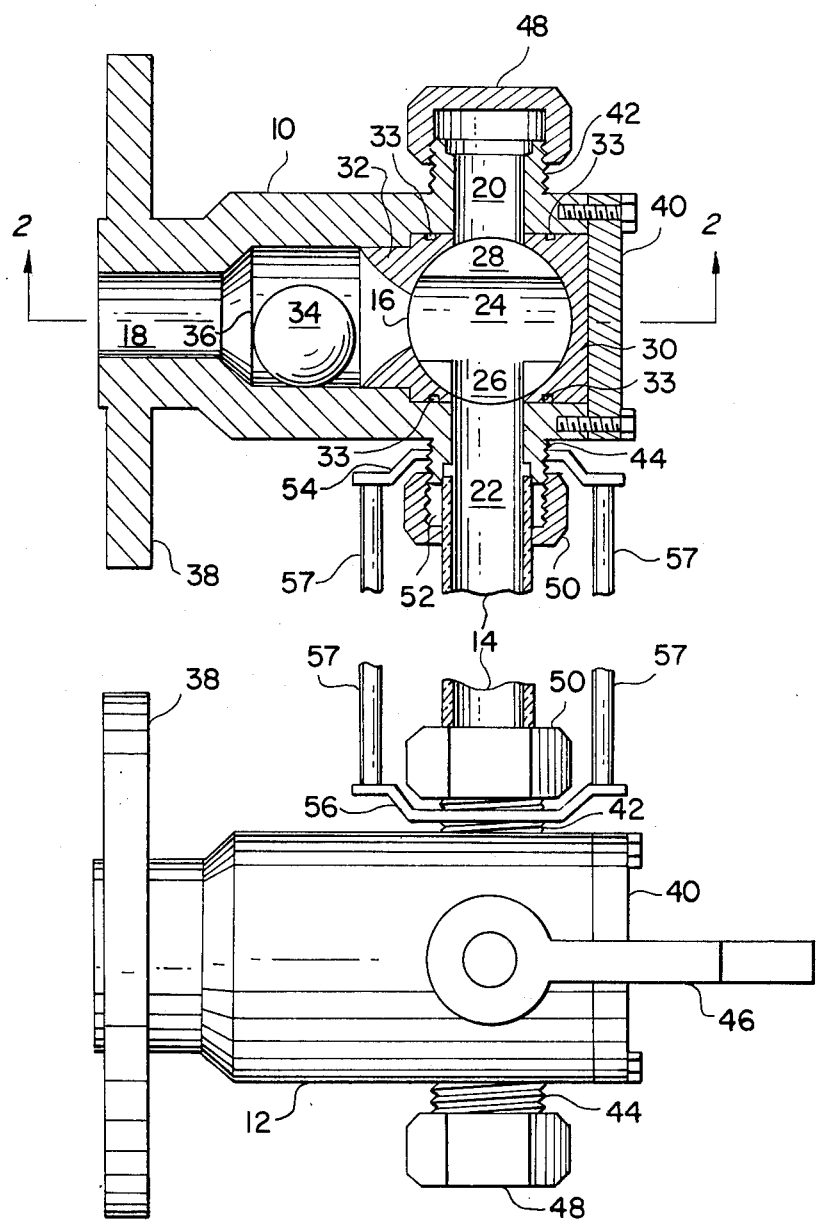
FIG. 1 shows a side view of the direct reading liquid level indicator according to the present invention.

Referring now to the drawings wherein like reference numerals designate identical or corresponding parts throughout the several views, and more particularly to FIG. 1, there is shown a direct reading liquid level indicator having an upper valve 10, a lower valve 12 and a sight glass 14. Upper valve 10 has been shown in cross section to illustrate the internal machanisms while lower valve 12 illustrates the valve exterior. Valves 10 and 12 are identical in structure and reference to any portion of one includes the corresponding portion of the other.

Passageways through the interiors of valves 10 and 12 are defined by ball valves 16, lateral valve passageway 18, top valve passageway 20, and bottom valve passageway 22. A sight glass passageway for upper valve 10 is defined by bottom valve passageway 22 and a sight glass passageway for lower valve 12 is defined by upper valve passageway 20. Passageways 20 and 22 are parallel to one another and along the same axis while lateral valve passageway 18 is perpendicular to them. Top valve passageway 20 of upper valve 10 and bottom valve passageway 22 of lower valve 12 serve as auxiliary passageways to aid in cleaning as will be explained hereinafter. Ball valve 16 has a first ball passageway 24 extending completely through it to serve as its main passageway and a second ball valve passageway 26 perpendicular to passageway 24 and extending from the exterior of ball valve 16 to a point of intersection with passageway 24. Blocking portion 28 of ball valve 16 is defined by the uninterrupted wall of first ball valve passageway 24 opposite the point of intersection of passageway 24 and 26 and runs perpendicular to the axis of second ball valve passageway 26. Front and rear valve seats 30 and 32 which are secured by O-ring seals 33 serve to hold ball valve 16 in place to allow it to rotate but not to be laterally displaced. A check valve 34 made of corrosion resistant steel is provided in lateral valve passageway 18 to seal off ball valve 16 in the event that sight glass 14 breaks while ball valve 16 is open. Rear valve seat 32 is designed to be restrictive enough to prevent complete passage of check ball 34 through ball valve 16, and a stainless steel perforated disk 36 is pressed into lateral valve passageway 18 to prevent check ball 34 from back sealing or leaving the valve.

The exterior of valves 10 and 12 comprises mounting flange 38, front valve seat plate 40, top and bottom externally threaded extensions 42 and 44, respectively, and rod 46. Mounting flanges 38 serves to connect valves 10 and 12 to the liquid filled container being monitored (not shown) and when it is in position the liquid can flow through lateral valve passageway 18 to ball valve 16. Front valve seat plate 40 is screwed onto the valve to hold front valve seat 30 and, hence, ball valve 16 in place. Top and bottom externally threaded extensions 42 and 44 are identical and thus can serve for having either a clean-out cap 48 or packing nut 50 screwed onto them. If the valve is being used as an upper valve the clean-out cap 48 will be screwed onto top extension 42 and the packing nut 50 onto bottom extension 44. Use of the valve as a lower valve is accomplished by screwing the clean-out cap 49 onto bottom extension 44 and packing nut 50 onto top extension 42. The interiors of extensions 42 and 44 define the top and bottom valve passageways, respectively. Rod 46 is journaled into ball valve 16 and allows for external control of the ball valve's rotational position inside of valves 10 and 12.

Attachment of sight glass 14 to bottom extension 44 of upper valve 10 and top extension 42 of lower valve 12 is accomplished by means of a packing nut 50 which wedges a rubber or similar material 0-ring packing 52 around the sight glass. Extension 42 and 44 are counterbored which allows sight glass 14 to seat in the counterbore at the top extension 42 of lower valve 12. Sight glass 14 does not extend fully into the counterbore in bottom extension 44 of upper valve 10 since to replace the sight glass sufficient space must be left to slide the sight glass up into that counterbore to permit removal of the sight glass at its lower connection. Upper and lower protective rod holders 54 and 56 are threaded onto extensions 42 and 44 between packing nuts 50 and the bodies of valves 10 and 12, respectively. Class-A protection of sight glass 14 can be attained by providing rods 57 to extend between upper and lower rod holders 54 and 56 thus allowing good protection against breakage as well as 360° visability of sight glass 14.

Figure 2:
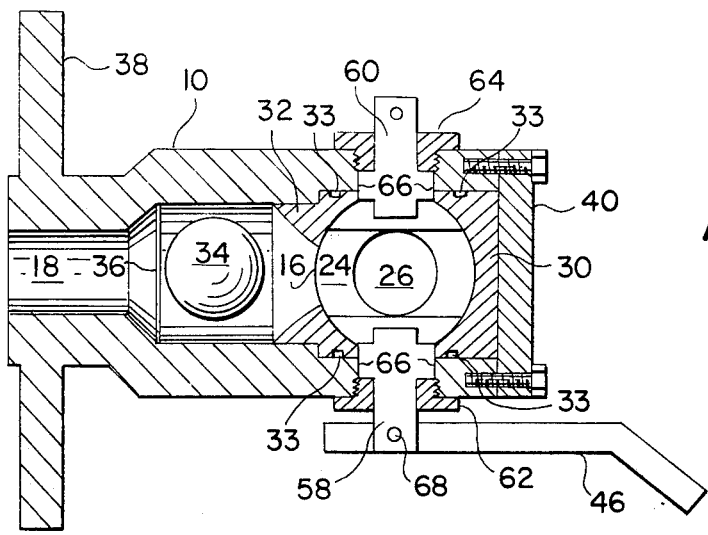
FIG. 2 shows a cross section top view of the upper valve taken along line 2—2 of FIG. 1 in accordance with the present invention.

FIG. 2 shows a cross-sectional top view of upper valve 10 taken along line 2—2 of FIG. 1 to illustrate the mounting of ball valve 16 within valve 10. Journals 58 and 60 are press fitted into ball valve 16 along an axis prependicular to the axes of first and second ball valve passageways 24 and 26 and will rotate with rotation of the ball valve. Journal caps 62 and 64 mount journals 58 and 60 in the valve body 10 and the journals can rotate at bearing surfaces 66. External control of the rotation and, hence, ball valve 16's position is provided by movement of rod 46 which is fixed to the end of journal 58 by set screw 68.

Figure 3A:
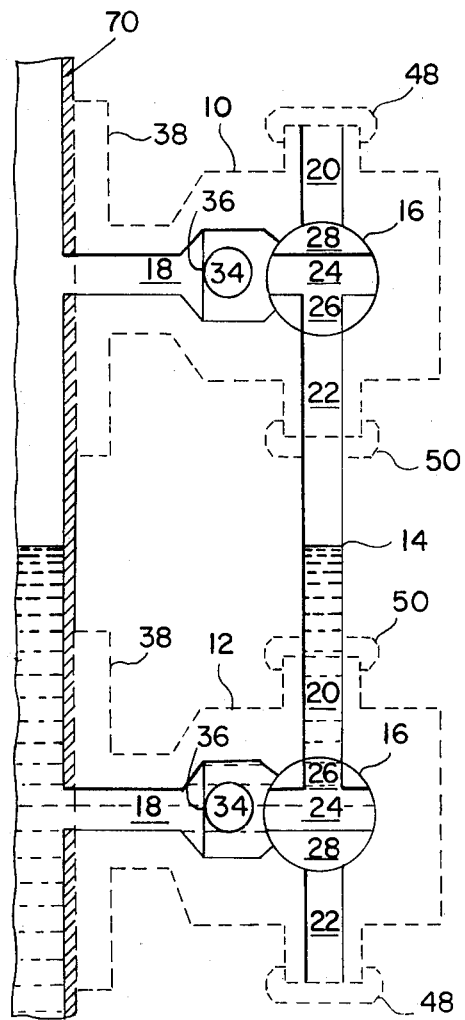
FIG. 3a and 3b show the opened and closed positions of the liquid level indicator in accordance with the present invention.
Figure 3B:
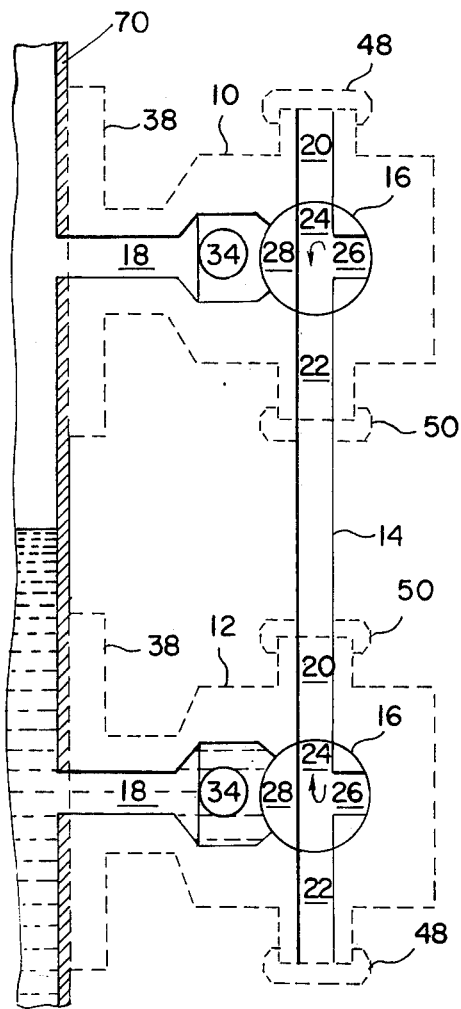

FIGS. 3a and 3b illustrate the operation of the liquid level indicator as defined by the opened and closed positions of valves 10 and 12. In the open position shown by FIG. 3a the upper valve 10 will have its ball valve 16 rotated such that its first ball valve passageway 24 is in alignment with its lateral valve passageway 18 and its second valve passageway 26 is in alignment with its bottom valve passageway 22. In the meantime lower valve 12 will have its ball valve 16 positioned so that its first ball valve passageway 24 is in alignment with its lateral valve passageway 18 while its second ball valve passageway 26 is in alignment with its top valve passageway 20. The liquid level indicator can be closed as shown by FIG. 3b simply by rotating each of the rods 46 through 90° to the respective closed positions for valves 10 and 12. This entails a 90° clockwise motion for the rod 46 of lower valve 12 and a 90° counterclockwise motion for rod 46 of upper valve 10. In the closed position both upper and lower valves 10 and 12 have their ball valves 16 positioned such that their first ball valves passageways 24 are in alignment with both their top and bottom valve passageways 20 and 22 respectively while their blocking portions 28 are in alignment with their inlet valve passageways 18. It can be seen that in this closed position the water supply from the liquid filled tank 70 will be blocked in inlet valve passageways 18 while a straight uninterrupted passageway is defined by the sight glass 14 together with the top and bottom passageways 20 and 22 and the first ball valve passageways 24 of the upper and lower valves 10 and 12. Cleaning of this uninterrupted passageway can be readily accomplished merely by removing one or both of the clean-out caps 48 from the upper and lower valves 10 and 12 and inserting a swab or other suitable cleaning device through the uninterrupted passageway. Removal of the sight glass can also easily be done in the closed position simply by loosening the packing nuts 50 from their respective extensions 42 and 44, lifting the sight glass up into the counterbore in bottom extension 44 of upper valve 10 and sliding out the lower end of the sight glass.

There has therefore been provided a convenient direct reading liquid level indicator which can be opened and closed by a 90° rotation of the upper and lower valve rods and which provides for easy cleaning and sight glass removal while the indicator is in the closed position. Since the valves are identical, they can readily be interchanged allowing for a substantial decrease in part stock requirements. If employed on a typical ship boiler tank, the mounting flange 38 should be at least $\mu$ inch diameter and rated at ASA 300 pounds.

Obviously many other modifications and variations of the present invention are possible in light of the above teachings. The device can readily be modified for use of a Class-B sight glass protective shield which completely surrounds the sight glass 14 except for a narrow slit through which to view the sight glass. Such modification would simply require replacing upper and lower protective rod holders 54 and 56 with protective shield holders. It is therefore to be understood that within the scope of the appended claims the invention may be practiced otherwise than as specifically described therein.

What is claimed and desired to be secured by Letters Patent of the United States is:

1. A direct reading liquid level indicator for monitoring liquid levels in liquid filled containers comprising:
   upper and lower valves, each of said valves having a inlet lateral walled passageway and an outlet sight glass walled passageway perpendicular to said lateral passageway to allow the flow of liquid from said container to pass through said valves;
   a sight glass connected between said sight glass passageways of said upper and lower valves;
   ball valves located in each of said upper and lower valves between said inlet and outlet passageways to allow connection and disconnection of said lateral and sight glass passageways by a 90° rotation of said ball valves;
   an auxiliary passageway extending from the exterior of each of said valves to said ball valves parallel to and on the same axis as the sight glass passageways, whereby when both ball valves are in a closed position the lateral passageways of said upper and lower valves are blocked off and an uninterrupted walled clean-out passageway is defined between said auxiliary passageways, said ball valves, said sight glass passageways and said sight glass;
   a check valve located in said lateral passageways to seat against said ball valve and prevent the passage of liquid therethrough in the even said sightglass is broken while the liquid level indicator is in an open position; and a perforated disk pressed into each of the walls of said lateral valve passageways to prevent said check ball valve from back sealing or leaving the valve.

2. A direct reading liquid level indicator as defined in claim 1 wherein said sight glass and auxiliary passageways extend from said ball valves to the exteriors of said upper and lower valves via identical externally threaded extensions.

3. A direct reading liquid level indicator for monitoring liquid filled containers comprising:
  upper and lower valves each of said upper and lower valves comprising:
    a valve body;
    a ball valve within said valve body having a first ball valve passsageway extending completely through said ball valve, a second ball valve passageway perpendicular to said first ball valve passageway extending from the exterior of said ball valve to a point of intersection with said first ball valve passageway, and a blocking portion defined by the uninterrupted wall of said main ball valve passageway opposite said point of intersection of said first and second ball valve passageway;
    a rod external said valve body with a shaft extending through said valve body to said ball valve to position said first and second ball valve passageways and said blocking portion of said ball valve;
  means for mounting said valves to said liquid filled container;
  identical top and bottom externally threaded extensions respectively extending from said top and bottom portions of said valve body;
  an lateral valve walled passageway extending through said valve from said mounting means to said ball valve to allow for communication between said liquid filled container and said ball valve;
  a top valve walled passageway extending through said top externally threaded extension and said valve body to a point of intersection with said ball valve; and
  a bottom valve passageway extending through said bottom externally threaded extension and said valve body to a point of intersection with said ball valve;
  a sight glass connected to the bottom valve passageway of said upper valve and the top valve passageway of said lower valve by a first packing nut screwed onto said bottom externally threaded extension of said upper valve and a second packing nut screwed onto said top externally threaded extension of said lower valve;
  a first clean-out cap screwed onto the top externally threaded extension of said upper valve; and
  a second clean-out cap screwed onto the bottom externally threaded extension of said lower valve;
  the open liquid level indicator position being defined when the upper valve has its ball valve positioned such that its first ball valve passageway is in alignment with its inlet valve passageway and its second valve passageway is in alignment with its bottom valve passageway while the lower valve has its ball valve positioned such that its first ball valve passageway is in alignment with its inlet valve passageway and its second ball valve passageway is in alignment with its top valve passageway,
  the closed liquid level indicator position being defined when both upper and lower valves have their ball valves positioned such that their first ball valve passageways are in alignment with both their top and bottom valve passageways and their blocking portions are in alignment with their inlet valve passageways, said closed position of the liquid level indicator allowing for an uninterrupted clean-out passageway extending from the first clean-out cap through said upper valve, said sight glass and said lower valve to said second clean-out cap, said clean-out passageway being free from liquid pressure from said liquid filled container,
  wherein the open and closed positions of said liquid level indicator are attained by 90° rotation of said rods of said upper and lower valves.

4. A direct reading liquid level indicator as defined in claim 3 further comprising:
  a check valve located in the said valve passageways of said upper and lower valves to seat against the first ball valve passageway and prevent the passage of liquid therethrough in the event said sight glass is broken while the liquid level indicator is in an open position.

5. A direct reading liquid level indicator as defined in claim 3 further comprising:
  a first protective rod holder located on the bottom threaded extension of said upper valve between said first packing nut and said upper valve body;
  a second protective rod holder located on the top threaded extension of said lower valve between said second packing nut and said lower valve body;
  protective rods extending between said first and second protective rod holders to provide protection to said sight glass.

6. A direct reading liquid level indicator as defined in claim 4 further comprising:
  a perforated disk pressed into the walls of each of said lateral valve passageway to prevent said check ball valve from back sealing or leaving the valve.

* * * * *